Jan. 18, 1927.
W. E. FRAIM
1,614,666
PADLOCK FOR TIRE CARRIERS
Filed June 12, 1926
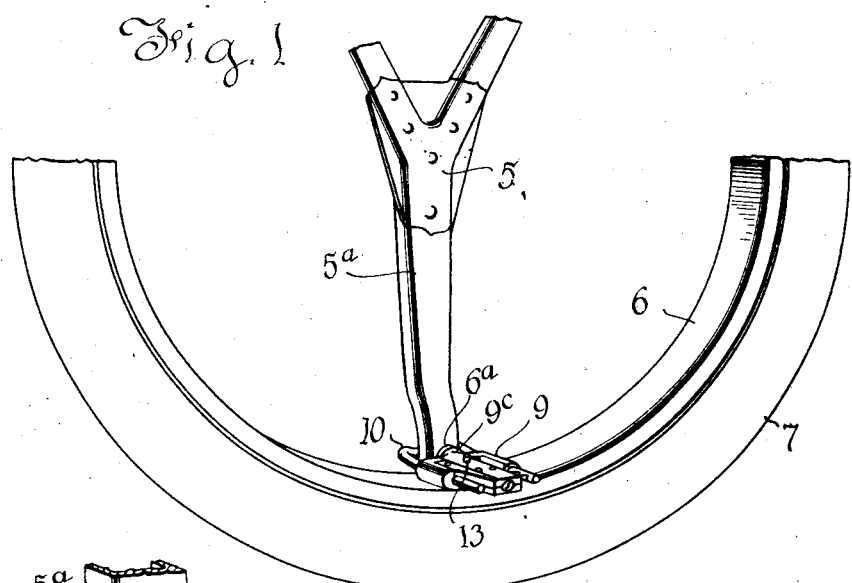
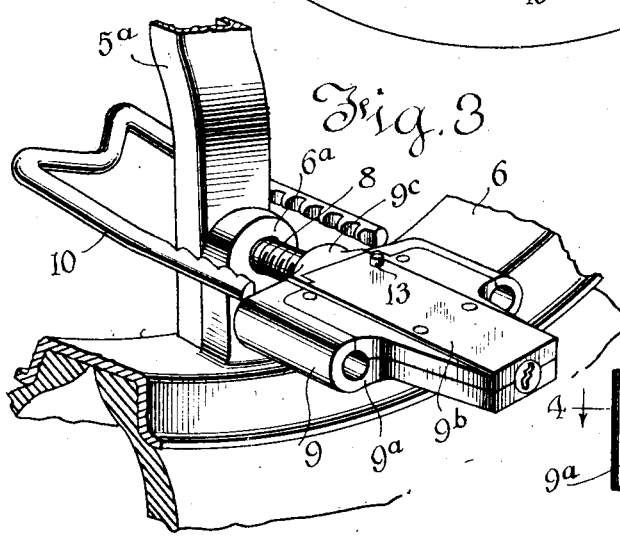
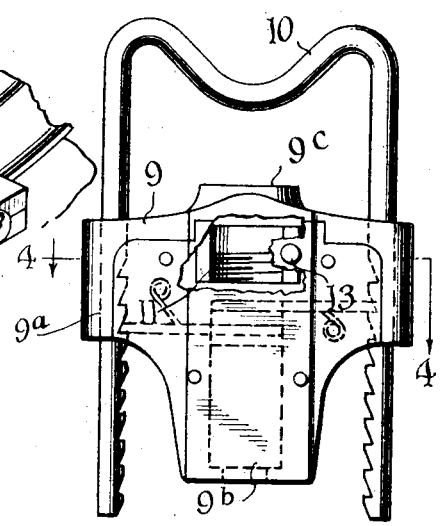
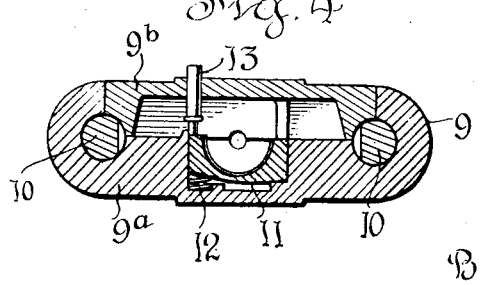
Inventor
Walter E. Fraim
By Dowell & Dowell
his Attorneys Patented Jan. 18, 1927.

1,614,666

UNITED STATES PATENT OFFICE.

WALTER E. FRAIM, OF LANCASTER, PENNSYLVANIA.

PADLOCK FOR TIRE CARRIERS.

Application filed June 12, 1926. Serial No. 115,655.

This invention relates to padlocks for securing rim-mounted tires to automobile spare-tire carriers to prevent their removal and theft and more particularly to a novel improvement in safety locks for tire carriers of the type with which the 1926 model Ford automobile is equipped.

The invention aims to provide a novel, simple and inexpensive locking device which may be instantaneously and securely applied to the rim-holding bolt of a carrier of the type mentioned, to take the place of the lug-engaging washer or cleat and nut provided on the carrier as a part of its equipment for securing a rim-mounted tire thereon.

The features of novel improvement will be best understood by reference to the accompanying drawings in which a practicable form of device embodying the invention has been illustrated in application to a carrier.

In said drawings:

Fig. 1 is a perspective view of a broken away portion of a tri-armed tire carrier of a type similar to that forming a part of the 1926 Ford automobile equipment, a tire with conventional rim being shown mounted in place thereon with one of the apertured lugs of the rim secured to an arm of the carrier by an improved locking device embodying this invention;

Fig. 2 is a plan view on an enlarged scale of a form of device or padlock embodying the invention, with a bi-armed shackle adaptable as a rim-mounted tire securing means on carriers of the type referred to, a portion of the padlock case being shown broken away;

Fig. 3 is a perspective view of broken away portions of carrier arm, tire and rim similar to Fig. 1 but on a larger scale, showing the shackle withdrawn from the body of the padlock and the latter removed from place on the rim-holding bolt, with the parts in engaging relation; and Fig. 4 is a sectional view through the body of the padlock taken on the line 4—4 of Fig 2.

Referring to said drawings, the numeral 5 denotes a portion of a spare-tire carrier, which in the form shown, is of the tri-armed type with which the 1926 model Ford automobile is equipped. The illustrated carrier includes a depending arm or frame-bar 5ª having its lower end adapted to abut against the inner peripheral face of a conventional rim 6 having an ordinary tire 7 mouted thereon. Said arm in this instance is of angle-iron cross-sectional shape and is shown securable to an apertured lug 6ª of said rim by means of a bolt 8 extending outwardly therefrom through the lug.

The diverging upwardly extended arm-portions of the tire carrier are adapted to support the rim with mounted tire in position easily to be removed and replaced when released from the depending arm-portion of the carrier, but in order to remove the mounted tire, it is necessary to draw the same with its lug 6ª outwardly from engagement with the bolt 8 of said arm-portion.

When the rim-mounted tire is placed on the carrier with the bolt 8 of the depending arm 5ª thereof extending through an apertured lug 6ª of the rim, it may be instantaneously and positively secured in supported position on the carrier by means of my improved locking device, merely by engaging the body 9 of the padlock over said bolt 8 and thereafter inserting the limbs of the shackle 10 through the body 9 of the padlock to the clamping position illustrated in Fig. 1.

In the illustrated embodiment of my invention, the body or case 9 of the padlock comprises opposed complementary plate or casing members 9ª and 9ᵇ formed with interior re-inforcing partitions for the accommodation and assembly of the usual lock tumblers and associated shackle-holding pawls within said case, and for the retention of the usual slotted slip-ring in one end of the case, through which a key for moving the tumblers to unlocking position may be inserted and turned. The locking mechanism within the case may be of any suitable construction, such as is commonly used in locks of different kinds; a suitable form being indicated in dotted lines in Fig. 3 of the drawings.

The casing-member 9ª is shown provided with a hollow neck-portion 9ᶜ and with apertured side portions through which the notched limbs or arm-portions of the shackle 10 are adapted to be extended in locking engagement with the holding pawls within the body of the padlock in a well known manner.

Said casing member 9ª is also shown formed with an internal recess adjacent its hollow neck-portion to receive a bolt-locking means comprising a parti-cylindric or segmental collar or nut 11 disposed within the body of the padlock substantially in alinement with the opening in said neck-portion, and an expansible spring 12 underlying said segmental collar or nut and tending to hold the same normally in a position eccentric to the opening in said neck and in the path of movement of the locking-bolt to be inserted in said opening.

The segmental collar or nut 11 is shown with its inner surface partially threaded so as to adapt the same to engagement with the threads of the bolt 8 when the body of the padlock is slipped over said bolt with the latter extending into the hollow neck in the casing member 9ª thereof.

In order to permit said body or case to be slipped over the bolt 8 in the manner stated, a push-pin 13 is shown having one end in contact with the aforesaid segmental collar or nut 11 and its other end extended through the body or case and adapted by pressure of the finger to depress said segmental element against the action of its spring 12 into alinement with the opening in the padlock body or case, so that the latter may be slipped over said bolt without interference by said threaded segmental element. After the body of the padlock has thus been slipped over the bolt 8, the finger pressure upon the push-pin 13 is released, whereupon the spring 12 will expand to move the segmental element 11 to normal position eccentrically of the opening of the neck and in threaded engagement with said bolt, instantaneously locking the body of the padlock in position on the bolt and preventing the same from being withdrawn therefrom until the push-pin 13 is again depressed to release the case from the bolt.

When the body of the padlock has thus been engaged with the bolt 8 of the carrier, with the lug 6ª of the rim held vise-like between said body and the arm 5ª of the carrier, the limbs or arm-portions of the shackle 10 are then inserted through the apertured side portions of said padlock body or case in the manner illustrated in Fig. 1, thus firmly securing the several parts together with the rim-mounted tire in locked position upon the carrier where it may not be removed until the shackle 10 of the padlock is released by a key and withdrawn from the case and said case is thereafter withdrawn from engagement with the bolt 8 by actuating the push-pin as already described.

The novelty, simplicity and advantages of the locking device described will be obvious from the foregoing description. It will be understood of course that while my improved safety device is designed and adapted for use in securing rim-mounted tires to tire carriers, so as to serve not only as a means for preventing a tire from being stolen, but also as a preventative means against the same becoming loosened and jarred off the rack while the automobile is driven over rough roads, it may be applied to various other uses not herein specifically mentioned.

Having thus described my invention, what I claim as new and desire to secure by Letters Patent of the United States is:

1. A padlock comprising a case having an opening therein for inserting the limb of a shackle in one end thereof, and another opening in said end for inserting a locking bolt; said case containing locking mechanism adapted to engage and lock the shackle to the case and provided with a key-hole in the end thereof opposite said openings for inserting a key adapted to release said shackle; means within said case adapted for locking engagement with said bolt, a spring serving to yieldingly force said means into locking engagement with said bolt, and a push-pin adapted to move said locking means against the pressure of said spring so as to release the bolt and allow it to move freely in or out of the opening therefor.

2. A padlock comprising a case having an opening or openings therein for inserting the limb or limbs of a shackle in one end thereof and another opening in said end for inserting a threaded bolt; said case containing locking mechanism adapted to engage and lock the shackle to the case and provided with a key-hole in the end thereof opposite said openings for inserting a key adapted to release said shackle, means within said case adapted to engage said bolt and lock the case thereto, a spring serving to yieldingly force said means into locking engagement with said bolt, and a push-pin adapted to engage and move said locking means against the pressure of the spring so as to allow the bolt to move freely in or out of the opening therefor.

3. A padlock comprising a case containing locking mechanism and having the two limbs of a substantially U-shaped shackle inserted through openings therein and adapted for locking engagement with said mechanism, and also having an opening therein to receive a threaded bolt between the first named openings, threaded spring-actuated locking means adapted to engage said bolt and lock the case thereto, and a push-pin for throwing said locking means out of engagement with said bolt and holding the same so as to permit the bolt to move freely in or out of the opening therefor; said case being provided with a key-hole in the end thereof opposite said openings for inserting a key adapted to release the shackle.

4. A padlock having a case provided with a non-threaded opening in one end thereof and means for instantaneously securing said case on a threaded bolt, said means consisting of a parti-cylindric body fitted in a recess adjacent said opening and having a threaded portion adapted to engage the threads of said bolt, a spring adapted to yieldingly force said body into contact with said bolt, and a push-pin adapted to engage and force said body against the pressure of said spring out of contact with the bolt, so that it may move freely into and out of the opening therefor.

5. A padlock having a case provided with an opening in one end thereof adapted to permit a bolt to move freely into and out of said opening, a device movably fitted in a recess adjacent said opening having means thereon adapted for interlocking engagement with a bolt inserted in said opening so as to prevent the bolt from being withdrawn, a spring tending to hold said device in engagement with said bolt, and means for moving said body out of engagement with said bolt against the pressure of said spring, so as to permit the bolt to be withdrawn.

In testimony whereof I affix my signature.

WALTER E. FRAIM.